US005201640A

United States Patent [19]

Heinzelmann et al.

[11] Patent Number: 5,201,640

[45] Date of Patent: Apr. 13, 1993

[54] SUCTION MUFFLER ASSEMBLY FOR HERMETIC COMPRESSORS

[75] Inventors: Gilberto Heinzelmann; Marcio L. Todescat; Dietmar E. B. Lilie, all of Joinville, Brazil

[73] Assignee: Empresa Brasileira De Compressores S/A -EMBRACO, Joinville, Brazil

[21] Appl. No.: 890,571

[22] Filed: May 28, 1992

[30] Foreign Application Priority Data

May 28, 1991 [BR] Brazil .............................. PI9102288

[51] Int. Cl.$^5$ .............................................. H04B 39/00

[52] U.S. Cl. .................................... 417/312; 417/902; 181/403; 181/229

[58] Field of Search ........................ 417/312, 313, 902; 181/229, 272, 249, 250, 403

[56] References Cited

U.S. PATENT DOCUMENTS

| | | | |
|---|---|---|---|
| 4,370,104 | 1/1983 | Nelson et al. | 417/902 |
| 4,401,418 | 8/1983 | Fritchman | 417/312 |
| 4,415,060 | 11/1983 | Bar | 181/272 |
| 4,582,468 | 4/1986 | Bar | 417/902 |
| 4,755,108 | 7/1988 | Todescat | 417/312 |
| 4,759,693 | 7/1988 | Outzen | 417/312 |
| 4,793,775 | 12/1988 | Peruzzi | 417/312 |
| 4,911,619 | 3/1990 | Todescat | 417/312 |
| 4,960,368 | 10/1990 | Lilie | 417/312 |

*Primary Examiner*—Richard A. Bertsch
*Assistant Examiner*—Peter Kortnyk
*Attorney, Agent, or Firm*—Darby & Darby

[57] ABSTRACT

Suction muffler assembly for hermetic compressors of the type including a cylinder block (4) mounted in the upper part of a hermetic case (3) and provided with a cylinder (10) lodging a reciprocating piston (15); a valve plate (11) attached to an open end of the cylinder (10) and having a suction orifice (**11*a*); a suction muffler assembly attached to the cylinder block (4) and including a hollow muffler body (100) provided with a gas inlet opening (101, 130*a*) and a gas outlet opening (121); and a suction duct (140) having one inlet end (141) connected to the gas outlet opening (121) and an opposite outlet end (142) in communication with the suction orifice (11*a*) of the valve plate (11), said hollow muffler body (100) being formed of a lower part (110), presenting an end peripheral edge (117), and a cover upper part (120) carrying the gas outlet opening (121) of the muffler body (100) and including a peripheral lower seating surface portion (127) to be seated onto the end peripheral edge (117) of the lower part (110) and an outer peripheral skirt (128) extending downwardly from and surrounding said lower surface portion (127), said gas inlet opening (101, 130*a*) being defined, at least partially, at the lower part (110) of the muffler body (100), said muffler assembly being further provided with attaching means (150) to hold and press the cover upper part (120) onto the end peripheral edge (117) of the lower part (110**) of the muffler body.

14 Claims, 6 Drawing Sheets

SUCTION MUFFLER ASSEMBLY FOR HERMETIC COMPRESSORS

BACKGROUND OF THE INVENTION

The present invention relates to a new constructive arrangement applied to a suction muffler assembly for hermetic compressors of the reciprocating type which are used in small refrigerating machines.

Hermetic refrigeration compressors of the reciprocating type consist usually of a motor-compressor unit mounted within a hermetically sealed case. These compressors are usually provided with a cylinder and a reciprocating piston, which takes in and compresses the refrigerant gas during the operation of the electric motor.

Due to the simplicity of construction, these compressors use reed type suction and discharge valves, which cause together with the piston an intermittent flow of refrigerant gas. This intermittent flow of refrigerant gas tends to cause noise, which makes necessary the provision of acoustic dampening systems including muffler assemblies mounted both in the suction and in the discharge line of the compressor.

In these compressors, the compression of the refrigerant gas generates high temperatures in the cylinder and in the cylinder head thereof, causing heat transmission to other metallic parts of the motor-compressor unit. These heated metallic parts start irradiating heat, superheating the refrigerant gas in the suction system of the compressor, causing a density decrease of the refrigerant gas which is taken into the cylinder, thus decreasing mass pumped and consequently the efficiency of the compressor.

In known compressors, this refrigerant gas superheating is almost always reduced by means of insulating plastic material suction muffler assemblies which are usually mounted away from the metallic parts of the motor-compressor unit.

These suction muffler assemblies made of plastic material having thermal insulating characteristics consist usually of a muffler body in the form of a hermetic shell mounted outside the cylinder head, having at least one internal chamber and being provided with a gas inlet opening and a gas outlet opening, the latter being tightly connected to the inlet nozzle of a body which defines, in its inside, independently or together with a portion of the cylinder head, a suction pipe that is maintained in fluid communication with the suction valve of the compressor.

Due to the complex construction of the internal portion of the muffler body, which internal portion can include several leading and deflecting means of gas flow, said muffler assembly is generally formed of two halves to be connected to each other by a tight fitting of their edges.

In the reciprocating compressors with a vertical shaft and having a pump disposed in the upper part of the case above the electric motor, the tightness of the fitting of said two parts and/or halves which form the muffler assembly is necessary to prevent the oil which is sprinkled on the cylinder head from penetrating into the muffler assembly, since this oil tends to be undesirably taken in by the cylinder of the compressor. It must be pointed out that the oil in question is the one which is being sprinkled under the upper part of the case inside, due to the rotation of the crankshaft of the compressor. The oil is pumped upwardly, from the sump defined at the bottom of the case, through a discharge longitudinal channel provided in said shaft, then it is discharged through the upper end of said shaft and spread over all parts of the compressor which are located inside the case.

To join the parts of the muffler assembly, several known processes have been used nowadays, such as ultrasound or vibration welding processes, gluing processes and mechanic fixing processes using sealing gaskets.

The ultrasound or vibration welding processes are only useful to join the parts made of the same material and present the inconvenience of a certain instability to guarantee the tight attachment of the parts. This instability requires a control over 100% of the produced pieces, in order to evaluate the tightness of the assembled parts. Moreover, these processes include the costs of welding machines, accessories, frequent maintenance and spare parts.

The gluing processes, in which the parts are joined by means of adhesives, involve high processing costs since, considering the high producing rates and the profiles of the parts to be glued, the use of automatic devices for the application of adhesives is expensive and complex. Another inconvenience of these processes is that the parts must be completely clean in the region of adhesion, otherwise leakage will occur. This fact, added to the problems of adhesive application, require a control over 100% of the produced pieces.

It should also be considered that the adhesive to be used has to resist the conditions of the environment, such as refrigerant gas and oil under high temperatures. These parameters restrict the types of adhesives that can be applied, thereby increasing the cost of the adhesives in the process.

In the mechanic fixing systems using sealing gaskets, the parts are joined by means of mechanic fixing means, such as clamps or rivets and, between the parts, a sealing gasket made of rubber or asbestus is used. Thus, the muffler assembly assimilates the cost of a sealing gasket made of a material which should resist the aforesaid conditions of the environment.

SUMMARY OF THE INVENTION

Thus, it is a general object of the present invention to provide a suction muffler assembly for reciprocating hermetic compressors which can overcome the above mentioned deficiencies, and which can be obtained from parts made of different materials through a process that does not require the provision of additional equipments and/or mounting means, besides those which are necessary to join the parts, so as not to allow the penetration of oil into the muffler assembly, at the joining line of the component parts thereof.

It is a further object of this invention to propose a suction acoustic muffler assembly which, besides the above mentioned characteristics, can create an adequate attenuation of the suction noise of the refrigerant gas, without sacrificing the thermal efficiency of the compressor.

These and other objects and advantages of the invention are attained in a compressor of the type comprising a hermetic case; a motor-compressor unit mounted within the hermetic case and including a cylinder block disposed in an upper part of the case, above the motor, and having a cylinder lodging a reciprocating piston and provided with an open end; a valve plate connected to the open end of the cylinder, having a suction orifice; a suction muffler assembly connected to the cylinder block, including a hollow muffler body having a gas inlet opening and a gas outlet opening; and a suction duct having one end connected to the gas outlet opening of the hollow muffler body and an opposite end in communication with the suction orifice of the valve plate.

According to the invention, the muffler body consists of a lower part having a peripheral edge at its open upper end, and a cover upper part carrying the gas outlet opening of the muffler body and including a peripheral lower seating surface portion to be seated onto the end peripheral edge of the lower part of the muffler body and an outer peripheral skirt extending downwardly from and surrounding said lower seating surface portion, the gas inlet opening in the muffler body being defined, at least partially, at the lower part of the muffler body; the suction muffler assembly being further provided with attaching means to hold and press the cover upper part against the end peripheral edge of the lower part of the muffler body.

In one embodiment of the invention, the peripheral skirt of the cover upper part has a conical internal face which is progressively drawn away from the external lateral face of the lower part of the muffler body defining, together with the height of the skirt, dropping and precipitating means for the oil that is sprinkled over the muffler assembly, preventing the oil from being taken into the muffler assembly through eventual clearances between both parts of the muffler body.

BRIEF DESCRIPTION OF THE DRAWINGS

The invention will be described now with reference to the attached drawings, in which.

DETAILED DESCRIPTION OF THE INVENTION

Figure 1:
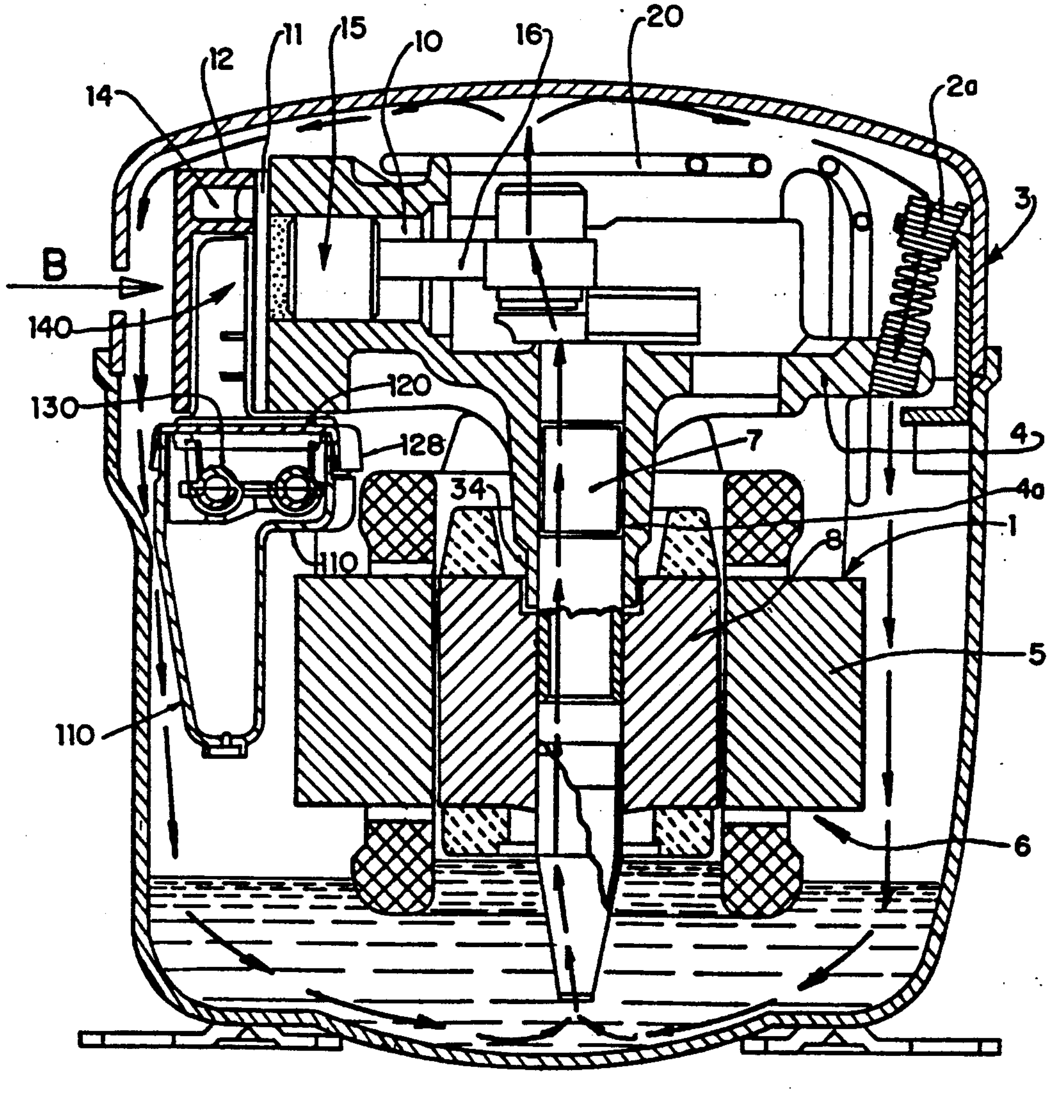
FIG. 1 shows a vertical longitudinal sectional view of a compressor according to the present invention.
Figure 2:
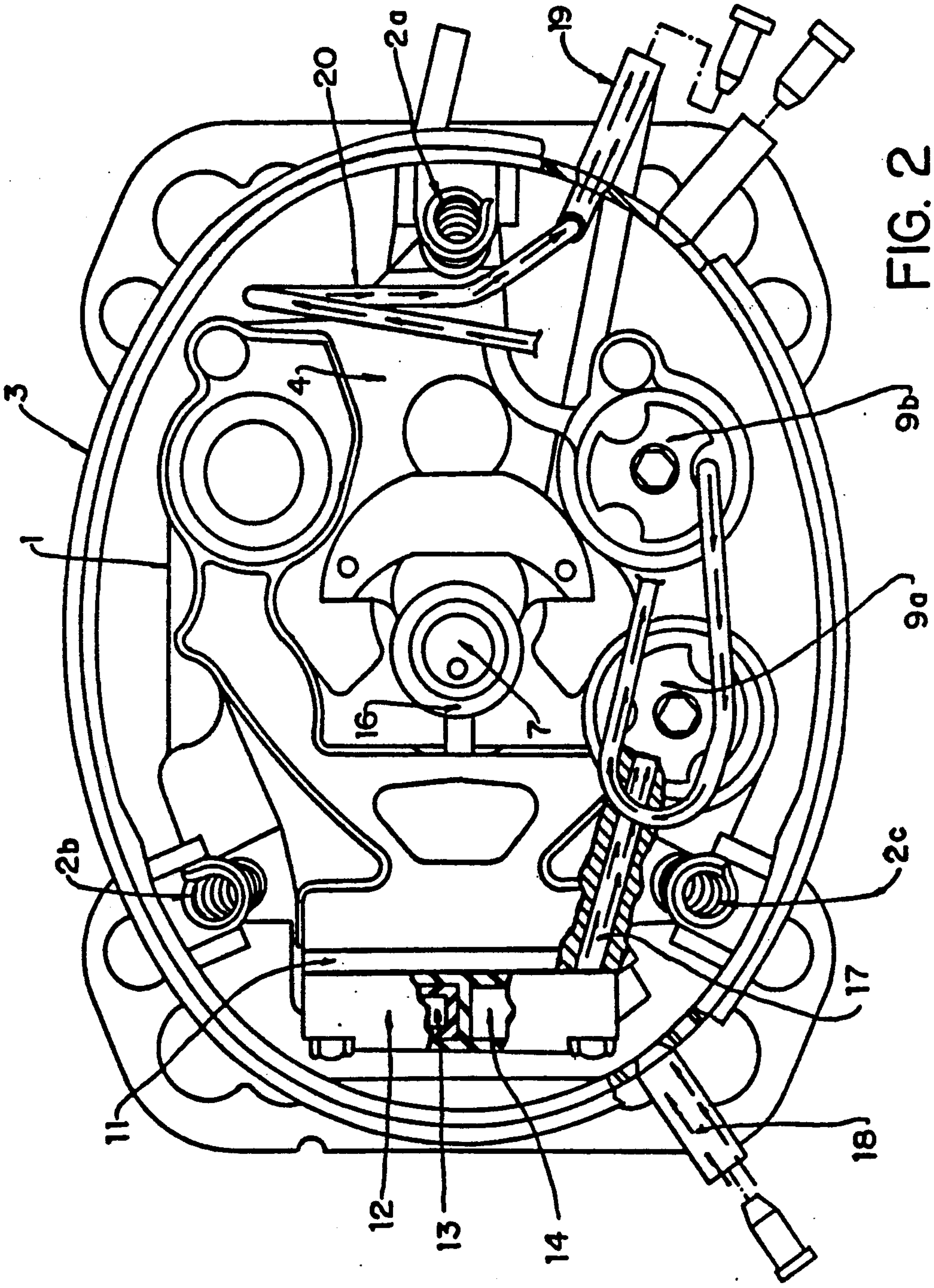
FIG. 2 shows a top view of the compressor illustrated in FIG. 1, without the casing cover.

According to the above mentioned figures, the motor-compressor unit 1 is suspended by means of springs 2a, 2b and 2c within the hermetic case 3. A cylinder block 4 supports a stator 5 of an electric motor 6 and embodies a bearing 4a for a crankshaft 7 attached to a rotor 8 of the electric motor 6.

Figure 3:
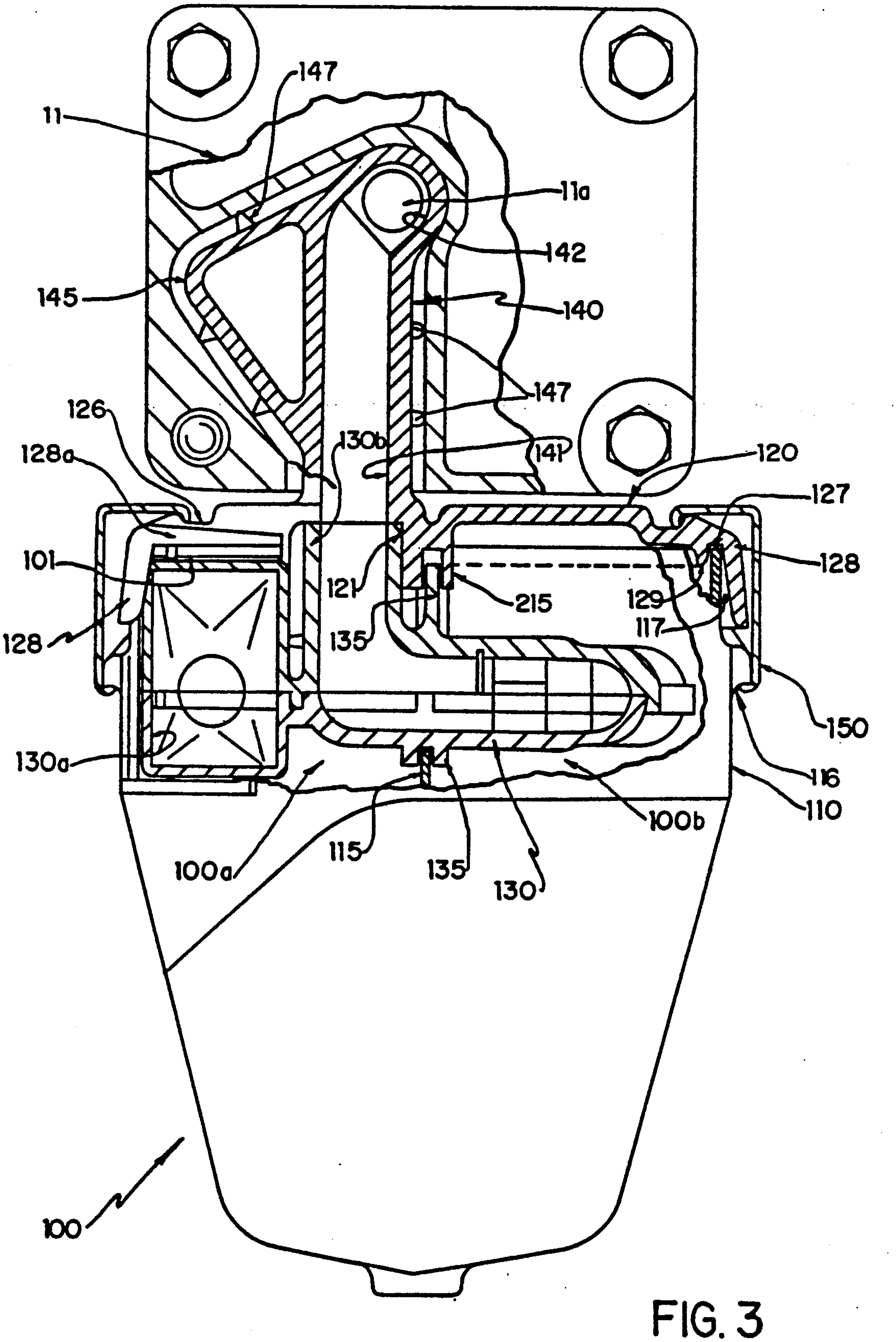
FIG. 3 shows a partial sectional view of the cylinder head and suction muffler assembly of the compressor, said view being taken according to the direction of "B" in FIG. 1.
Figure 4:
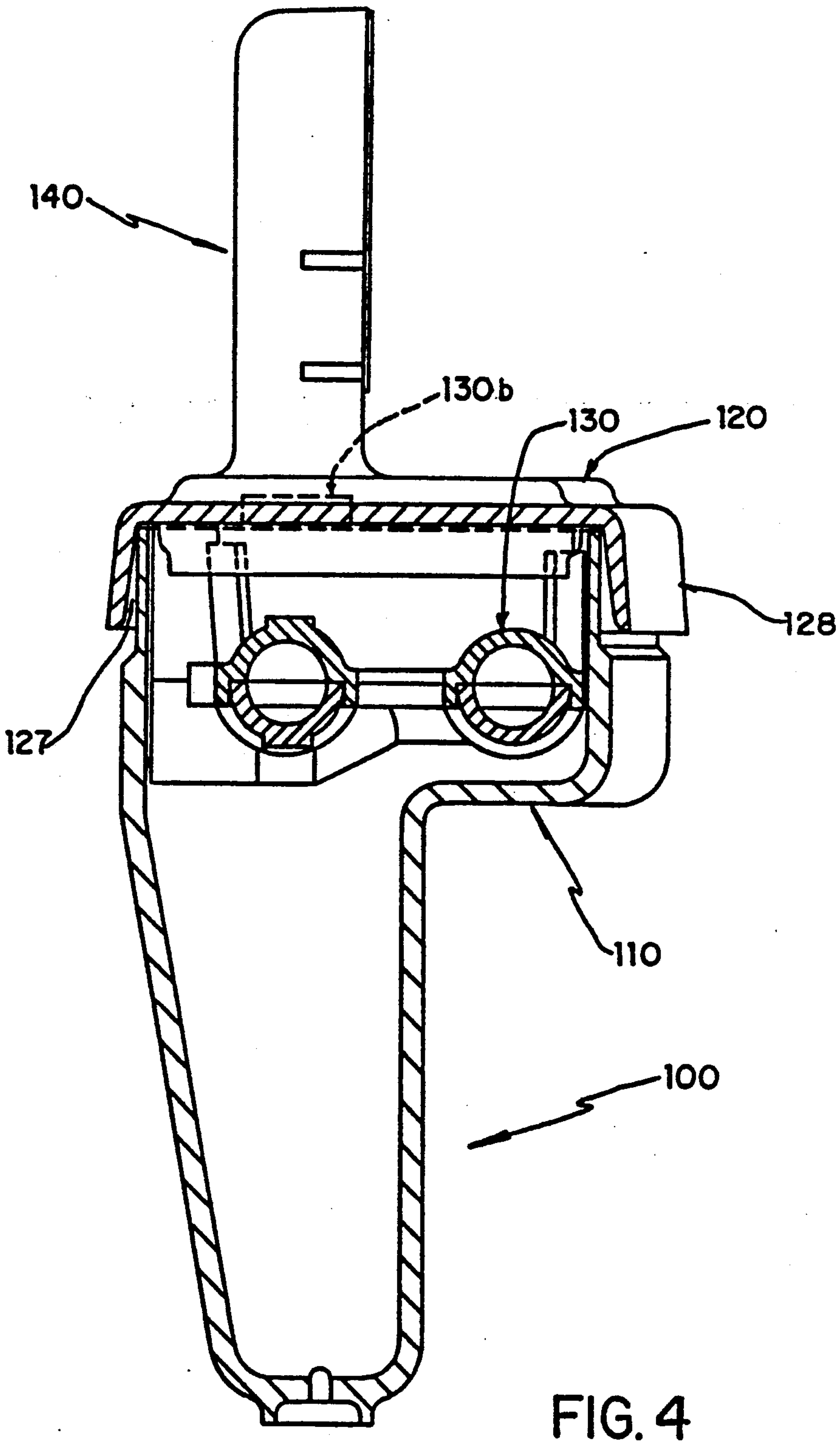
FIG. 4 shows a vertical longitudinal sectional view of the muffler assembly, taken according to a plan which is parallel to the direction of "B" in FIG. 1.
Figure 5:
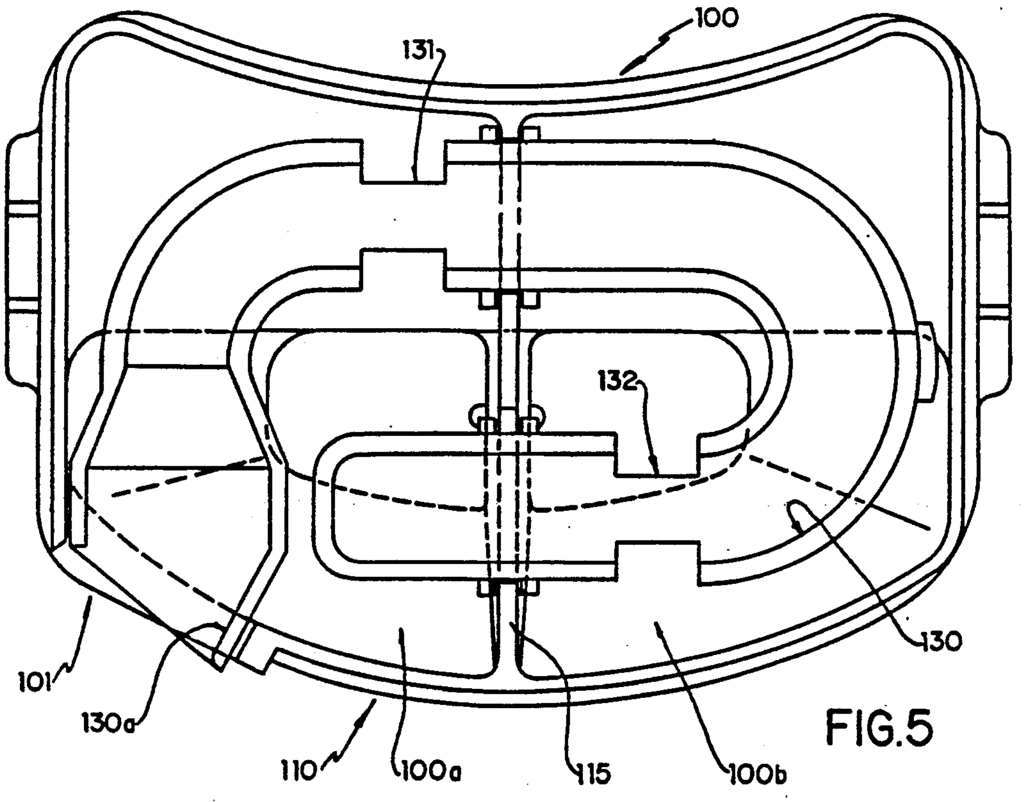
FIG. 5 shows an enlarged top plan view of the lower part of the acoustic muffler body, illustrating the lower half portion of the flow leading pipe.
Figure 6:
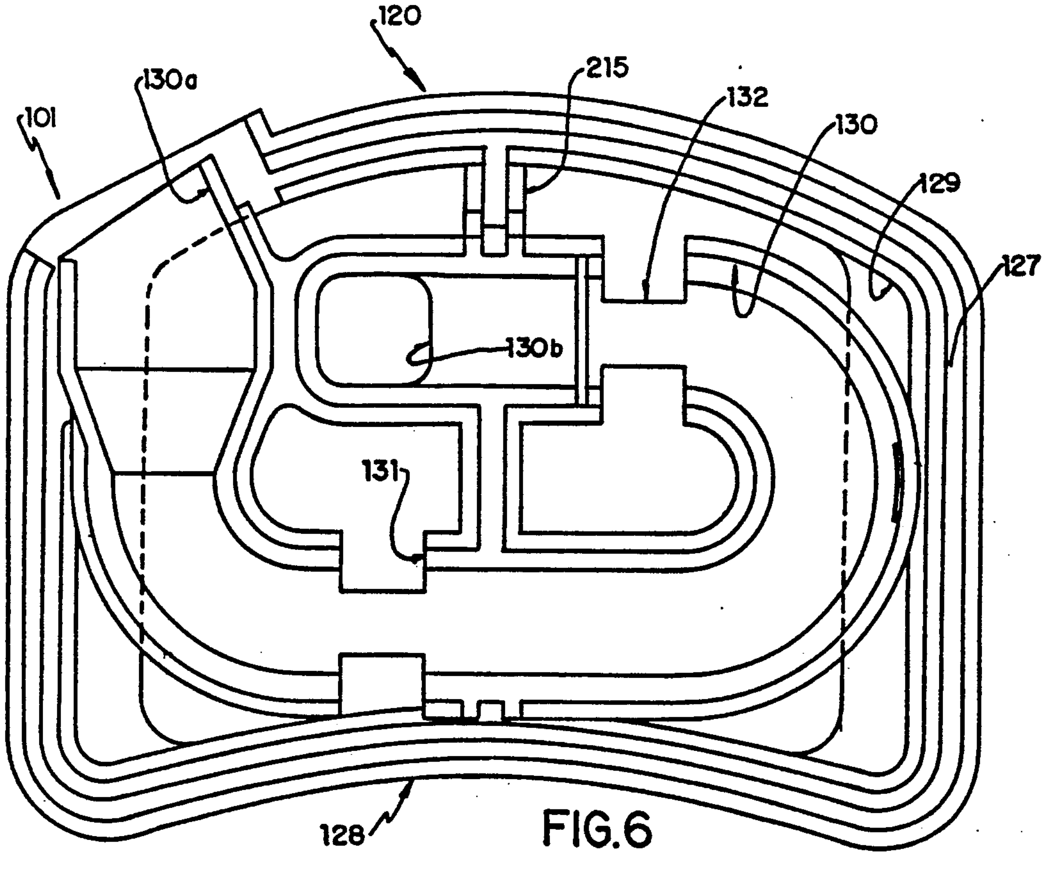
FIG. 6 shows an enlarged top plan view of the cover part of the acoustic muffler body, illustrating the upper half portion of the flow leading pipe.
Figure 7:
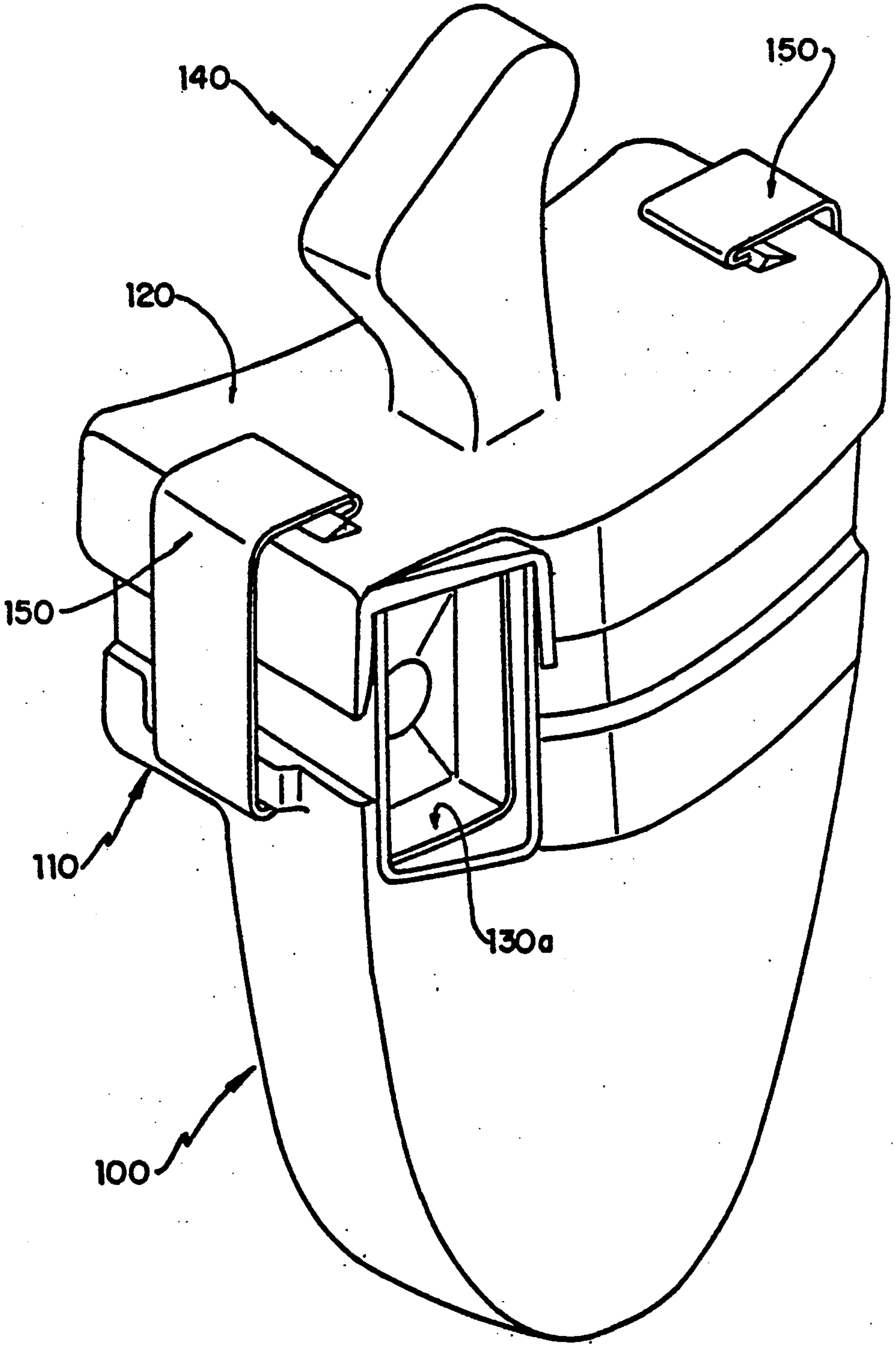
FIG. 7 shows a perspective view of the muffler assembly.

The cylinder block 4 embodies also the pulsation muffler chambers 9a and 9b for the discharge gas and a cylinder 10 in which are fastened a valve plate 11 and a cylinder head 12 that is provided with two internal cavities which are opened to its face adjacent the valve plate 11, defining the suction chamber 13 and the discharge chamber 14, as illustrated in FIG. 3. In the inside of cylinder 10 is mounted a piston 15 which is driven by the crankshaft 7 through the connecting rod 16. The cylinder block 4 still has an internal duct 17 interconnecting the discharge muffler chamber 9a to the discharge chamber 14 formed in the cylinder head 12.

The hermetic case 3 also supports a suction connector 18 and a discharge connector 19. A discharge pipe 20 has one of its ends attached to the discharge connector 19 and the other to the pulsation muffler chamber 9b for the discharge gas.

As illustrated in FIGS. 1, 3, 4 and 5, the suction muffler assembly comprises a pulsation acoustic muffler body 100 and a suction duct 140.

The acoustic muffler body 100 has the shape of a small shell mounted outside the cylinder head 12, at a slight distance therefrom and defining at least one internal chamber.

The small shell which defines the muffler body 100 consists of a larger lower part 110 and a cover upper part 120 which can be seated onto the lower part, in order to define a hollow body having a lateral gas inlet opening 101 formed at the joining line of the lower part 110 and the cover upper part 120; and an upper gas outlet opening 121 provided at the cover upper part 120.

In the illustrated embodiment, the muffler body 100 is internally divided into a first chamber 100a and a second chamber 100b by means of internal divisional wall portions 115 and 125, which are cooperative to each other and respectively and integrally connected to the lower part 110 and the cover upper part 120 of the muffler body 100.

The first chamber 100a includes said gas inlet opening 101 and gas outlet opening 121 of the muffler body 100.

Still according to the illustrated embodiment, inside the muffler body 100 is mounted a flow leading pipe 130 interconnecting the gas outlet opening 121 to the gas inlet opening 101 and disposed in such a way to cross the divisional walls 115 and 125 twice, in order to have a portion of its extension located within the second chamber 100b. The flow leading pipe 130 has an enlarged inlet end forming a nozzle 130a with rectangular sectional area. This nozzle 130a seals and extends outwardly from the gas inlet opening 101 of the small shell 100, so as to stay aligned and adjacent to the suction connector 18 of the hermetic case 3 of the compressor.

The flow leading pipe 130 is provided with radial openings 131 and 132 placed in the inside of the muffler chambers 100a and 100b and has its outlet end 130b in the form of an orthogonal extension which is fitted into the gas outlet opening 121 of the muffler body 100. As illustrated, the flow leading pipe 130 is preferably built in two halves, one of which incorporating, at its upper portion, the outlet end 130b to be fitted into the gas outlet 121 of the muffler body. The flow leading pipe 130 further presents external and mid transversal projections 135, preferably designed in a labyrinth form, in order to fit onto the separating walls 115, 125 of the muffler body 100.

According to the attached drawings, the end peripheral edge 117 of the lower part 110 of the muffler body 100 is continuous and has a substantially rectangular contour along most of the periphery of the muffler body, said continuity being only interrupted by a recess defining the gas inlet opening 101 provided on the side wall of the muffler body. It should be noted that the gas inlet opening 101 could be integrally provided at the lower part 110 of the muffler body and, in this case, the peripheral edge 117 would not have any interruption.

In order to be adapted onto the peripheral edge 117 of the lower part of the muffler body, the cover upper part 120 has a peripheral lower surface portion 127 which, in the illustrated example, is defined by the flat bottom of a groove formed between a pending peripheral skirt 128 and an internal pending rib 129, said groove having a width sufficient to receive in its inside the end peripheral edge 117 of the lower part of the muffler body, as shown in FIG. 3.

It should be understood that the provision of the internal pending rib 129 and the shape of the fitting of the parts illustrated in the drawings represents only one constructive embodiment, since said fitting can have a more complex form of labyrinth.

In the illustrated embodiment, the pending peripheral skirt 128 has a slightly conical internal face, which is drawn away from the side wall of the lower part 110 of the muffler body, in order to form a dropper over the muffler assembly. The skirt 128 and the internal rib 129 are interrupted in the region of the gas inlet opening 101 of the muffler body, when said region is provided at the partition line of the muffler body. In this case, the skirt 128 may have the form of a flange **128*a* projecting substantially horizontally above the enlarged inlet end 130*a* of the flow leading pipe 130**.

The attachment of the cover upper part 120 onto the lower part 110 of the muffler body 100 can be achieved through several releasable fixing means, which are operatively connectable to both parts of the muffler body. In the illustrated construction, the lower part 110 embodies two lateral projecting lugs 116, each defining at its lower portion a housing for the fitting and retention of the lower end of an elastic metallic clamp 150, the upper end of said clamp being adjustable to a respective recess 126 provided at the upper face of the cover part 120.

The attachment of the muffler assembly 100 to the cylinder block 4 is preferably achieved through the suction duct 140 itself, reducing even more the heat transfer to the refrigerant gas in the suction chamber.

The suction duct 140 has the shape of a hollow body formed so as to line the inside of the suction chamber 13 of the cylinder head 12 and it is provided with a gas inlet nozzle 141 tightly connected to the gas outlet opening 121 of the muffler body 100 and to the outlet end **130*b* of the flow leading pipe 130. The suction duct 140 also has a gas outlet opening 142 in fluid communication with a suction orifice 11*a* of the valve plate 11**.

In the illustrated construction, the suction duct 140 lines the inside of the suction chamber 13 defined between the cylinder head 12 and the valve plate 11. Nevertheless, it should be understood that the suction duct can present several constructions capable of assuring a proper fluid communication between the muffler body 100 and the suction orifice **11*a* of the valve plate 11**, independently of the existence of the cylinder head portion defining the suction chamber.

According to the attached drawings, the suction duct 140 forms a single piece with the cover upper part 120, the former being also provided with a lateral projection 145 which is not gas conductive, in order to adjust the contour of the suction duct 140 to the internal contour of the suction chamber 13, thus improving the retention of the muffler assembly to the cylinder block 4 and drawing away one side of the suction duct from the metallic wall of the cylinder head in the illustrated construction.

The lower part 110 of the muffler body 100 and the cover upper part 120, with or without the suction duct 140, are made of thermal insulating material, preferably of plastic compatible with the refrigerant gas and lubricant oil used in the compressor.

The external wall of the suction duct 140 is provided with projections 147 to make it lowered or drawn away, so as to maintain a small distance from the adjacent wall of the suction chamber 13 after its mounting on the valve plate 11. This spacing has the purpose of creating an additional thermal resistance between the metallic surface and the insulating material, reducing even more the flow of heat to the suction gas.

The refrigerant gas which is taken into the inside of the compressor case 3 through the suction connector 18, is conducted directly to the suction muffler assembly through the nozzle **130*a*** with rectangular cross sectional area.

When refrigerant gas is taken into the suction muffler assembly 100, it is led through the flow leading pipe 130 undergoing the action of the muffler chambers **100*a* and 100*b*, with which the flow leading pipe communicates through the radial openings 131 and 132**.

Following its course, the gas passes from the suction muffler body 100 to the suction duct 140 in the cylinder head 12, and is then taken into the cylinder 10, where it is compressed.

FIG. 1 illustrates by means of arrows, the flow of oil being pumped upwardly from the bottom of the case 3, throughout the discharge longitudinal channel provided in the shaft 7, against the upper internal face of the case, in order to sprinkle the upper part of the compressor and then, by gravity, drop back to the bottom of the case 3.

The suction muffler assembly described above and sprinkled by the refrigerant oil discharged through the shaft 7, has its muffler body built in such a manner to avoid the penetration of lubricant oil of refrigeration into the inside of the suction chamber 13, without requiring the provision of additional sealing means or processes between the component parts of the assembly.

We claim:

1. Suction muffler assembly for hermetic compressors of the type including a hermetic case (3) which defines a sump of lubricant oil at its bottom; a motor-compressor unit (6, 10, 15) mounted in the inside of the hermetic case (3) and including a cylinder block (4), which is disposed in an upper part of the case (3) above the motor (6) and sprinkled by the lubricant oil discharged from the bottom of the case, said cylinder block (4) being provided with a cylinder (10) lodging a reciprocating piston (15) and having an open end; a valve plate (11) attached to the open end of the cylinder (10) and provided with a suction orifice (**11*a*); a suction muffler assembly attached to the cylinder block (4) and including a hollow muffler body (100) which has a gas inlet opening (101, 130*a*) and a gas outlet opening (121); and a suction duct (140) having one inlet end (141) connected to the gas outlet opening (121) of the muffler body (100) and an opposite outlet end (142) in communication with the suction orifice (11*a*) of the valve plate (11), said suction muffler assembly being characterized in that said hollow muffler body (100) is formed of a lower part (110), presenting a peripheral edge (117) at its open upper end, and a cover upper part (120) carrying the gas outlet opening (121**) of the muffler body (100) and including a peripheral lower seating surface portion (127) to be seated onto the end peripheral edge (117) of the lower part (110) of the muffler body (100) and an outer peripheral skirt (128) which extends downwardly from and surrounds said peripheral lower seating surface portion (127), the gas inlet opening (101, 130*a*) being defined, at least partially, at the lower part (110) of the muffler body (100), the muffler assembly being further provided with attaching means (150) to hold and press the cover upper part (120) onto the end peripheral edge (117) of the lower part (110) of the muffler body.

2. Suction muffler assembly, as in claim 1, wherein the gas inlet opening is defined at the partition line of the muffler body (100) by a recess (101) which is provided on the side wall of the lower part (110) of the muffler body (100) and on the peripheral skirt (128) of the cover upper part (120).

3. Suction muffler assembly, as in claim 2, wherein the peripheral skirt (128) has the form of a flange (128*a*) extending substantially horizontally away from the contour of the cover upper part (120).

4. Suction muffler assembly, as in claim 1, wherein the peripheral lower seating surface portion (127) of the cover upper part (120) is defined between the outer peripheral skirt (128) and an internal pending rib (129) which is incorporated to the cover upper part (120).

5. Suction muffler assembly, as in claim 1, wherein the outer peripheral skirt (128) presents a slightly conical internal face which is drawn away from the side wall of the lower part (110) of the muffler body (100), in order to define a dropper for the lubricant oil that is sprinkled over the suction muffler assembly.

6. Suction muffler assembly, as in claim 1, wherein the fixing means between said both parts (110, 120) of the muffler body (100) comprise elastic metallic clamps (150), the opposite ends thereof being respectively fitted and held through clamp fitting and retention means (116, 126) provided at the lower part (110) and at the cover upper part (120) of the muffler body (100).

7. Suction muffler assembly, as in claim 6, wherein the clamp fitting and retention means comprise lateral lugs (116), which are incorporated to the lower part (110), and respective recesses (126) provided at the upper face of the cover part (120).

8. Suction muffler assembly, as in claim 1, wherein the suction duct (140) forms a single piece with the cover upper part (120).

9. Suction muffler assembly, as in claim 1, said compressor further including a cylinder head (12) which internally defines, together with the valve plate (11), a suction chamber (13) in communication with the suction orifice (11*a*), wherein said suction duct lines the inside of the suction chamber (13).

10. Suction muffler assembly, as in claim 2, wherein said suction duct (140) incorporates lateral spacing projections (145, 147) which are not gas conductive and abut the internal walls of the suction chamber (13).

11. Suction muffler assembly, as in claim 1, wherein the muffler body (100) is internally divided in at least two chambers (100, 100*b*), by means of divisional wall portions (115, 125), which are respectively and integrally connected to the lower part (110) and to the cover upper part (120), said muffler body (100) being provided with a flow leading pipe (130) interconnecting the gas inlet opening (101) to the gas outlet opening (121), extending through said chambers (100, 100*b*) and presenting radial openings (131, 132) located in the inside of said chambers.

12. Suction muffler assembly, as in claim 11, wherein said gas inlet opening (101) and gas outlet opening (121) are located in the same internal chamber of the muffler body (100).

13. Suction muffler assembly, as in claim 11, wherein said flow leading pipe (130) is formed of two halves, one of which incorporating and defining the outlet end (130*b*) to be fitted into the gas outlet opening (121) of the muffler body (100).

14. Suction muffler assembly, as in claim 11, wherein the flow leading pipe (130) incorporates external and mid transversal projections (135) to be fitted onto the divisional walls (115, 125) of the muffler body (100).

* * * * *